UNITED STATES PATENT OFFICE.

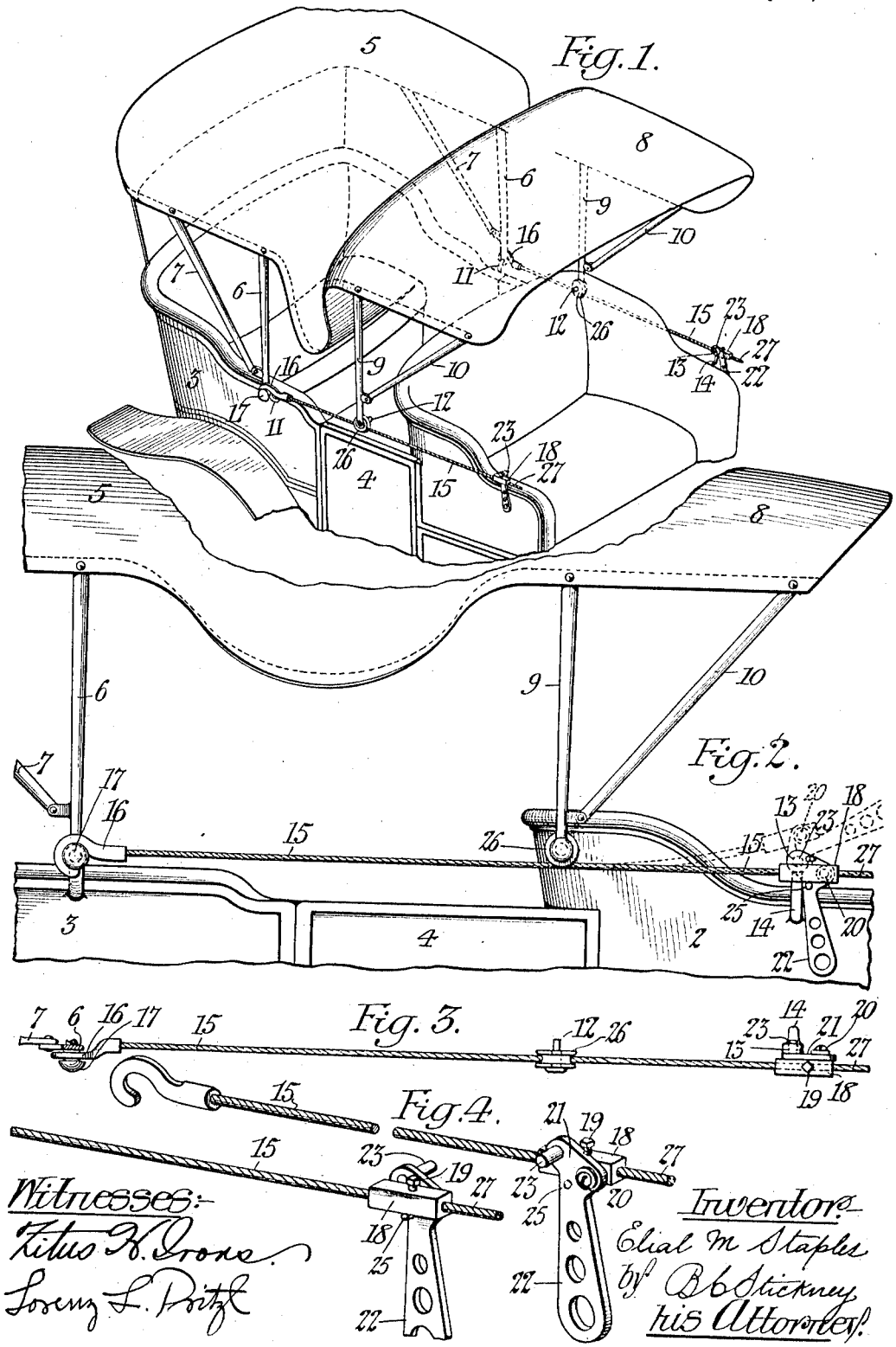

ELIAL M. STAPLES, OF ELIZABETH, NEW JERSEY.

FOLDING TOP FOR VEHICLES.

1,061,641.   Specification of Letters Patent.   Patented May 13, 1913.

Application filed February 28, 1912. Serial No. 680,441.

*To all whom it may concern:*

Be it known that I, ELIAL M. STAPLES, a citizen of the United States, residing in Elizabeth, in the county of Union and State of New Jersey, have invented certain new and useful Improvements in Folding Tops for Vehicles, of which the following is a specification.

This invention relates to folding tops for large vehicles, particularly automobiles. These tops are so large and cumbersome that it usually requires the services of two men to either fold or unfold one. The top usually comprises a rear folding portion or section, which is hinged directly upon the rear seat, and a front portion or section which, when in use, is detachably connected to the front seat. The management of this front section is so difficult as to be almost prohibitive, except where two men are available, one to grasp and carry the top at each side.

The object of this invention is to provide improved means to float the forward section of the top between its front and rear positions; or, in other words, to provide a support upon which said forward section of the top may be carried between said positions.

Tracks are placed at the sides of the vehicle, and rolls or devices on the sides of the front top-section run upon said tracks, whereby a substantial portion or all of the weight of said front top-section may be supported, so that it is only necessary to push or pull said top-section, which can very conveniently be managed by a single person. These tracks are preferably provided, each at its ends, with hooks or catches to attach to the front and rear seats or frames of the automobile. When in use they close the gap between said seats; but after the top is adjusted, the tracks may be swung down, or preferably detached from the vehicle.

In order to avoid the objection of bulk due to the length of the tracks, the same are preferably formed of flexible wire rope, and each can be tautened when put into working position, and may also be locked in tautened condition; so that the attendant needs only to run the front top-section along the tracks, which remain rigid without further attention. The flexibility of the tracks renders them easily foldable into small compass, so that they can be readily stowed in a small box usually provided upon the automobile. Provision is also made for adjusting the tracks to different sizes of vehicles.

Other features and advantages will hereinafter appear.

In the accompanying drawings, Figure 1 is a perspective view of a two-seated automobile provided with the present improvements, the front top section being shown riding upon the temporary tracks midway between its front and rear positions. Fig. 2 is a side elevation of the same on a larger scale. Fig. 3 is a plan of one of the tracks attached to the vehicle. Fig. 4 is a perspective view of one of the tracks detached from the machine.

The automobile 1 has front and rear seats 2, 3, between which occurs a gap, which is usually closed by a door 4. The foldable top usually comprises a rear section or portion 5, supported upon top irons or folding frames 6, 7, and a front extension or portion 8, connected to the rear portion and supported upon foldable frames 9, 10. The frame 6 is usually hinged upon a pair of brackets 11, provided upon the sides of the rear seat. The frames 9 have pins 12 to fit into sockets 13 provided in brackets 14 attached to the sides of the front seat. The frame 9 may be sprung to withdraw said pins 12 from sockets 13, and then the forward section may be carried back against or upon the rear section, which swings down about its hinge.

I provide either one or a pair of wire rope or flexible tracks 15, each having at one end a hook 16, to catch detachably upon a button 17. These buttons are usually provided on the opposite brackets 11, at the points where the legs of the frame or bow 6 are hinged thereto. The front end of each rope 15 passes through a block 18, and is secured therein by a set screw 19. This block is pivoted at 20 to a short arm 21 of a lever 22, the latter having a fulcrum pin 23, which is temporarily inserted in the socket 13 in bracket 14. The arm 21 of the lever has a toggle relation to the track 15, the latter being thereby swung up and down about the pivotal point 17. When a track is placed upon the vehicle, the parts are in the dotted-line positions at Fig. 2, the track 15 being loose; but upon swinging the handle 22 down to the full-line position, the track 15 is tautened by reason of the toggle action; and the pivot 20 is carried beyond the dead center, that is, to a point below a line joining the pivots 17 and 23, whereby the rope is locked in its tautened condition, a stop pin 25 being preferably provided to limit the downward swing of the arm 22.

Upon the pin 12 of each of the legs of the frame 9 of the forward top iron or section is provided a wheel 26, which is grooved to run upon the track 15. These wheels may be otherwise attached to said legs.

From the foregoing, it will be seen that in order to raise and set the top, it is only necessary to attach the hooks 16 to the button 17, and insert the pins 23 in the sockets 13 and pull down the handles 22 as far as they will go; whereupon the wheels 26 may be set upon the tracks 15, and the top section may then easily be drawn forwardly, thus fully extending the top. Then one of the handles 22 may be raised to loosen the rope 15, and the pin 23 may then be taken out of the socket 13, and the pin 12 on the leg of frame 9 may be inserted in said socket for the usual purpose of securing the front portion of the top. The same operation may be then performed at the other side of the automobile, detaching the pin 23 from the socket 13, and inserting the pin 12 in lieu thereof. The hooks 16 may then be cast off from the button 17, and the tracks may be coiled up and stowed away.

In folding the top, one hook 16 is attached to a button 17, one of the pins 12 is withdrawn from its socket 13, the pin 23 is inserted in said socket, the handle 22 is turned down, and the wheel 26 is placed upon the track or support 15. This operation is repeated at the other side of the vehicle. Then the front section 8 of the top is conducted back upon the tracks or supports 15, and both front and rear sections are folded down around the back seat 3 assuming their usual folded positions. The tracks 15 may then be detached and stowed away.

In order to adapt the tracks or supports to various sizes of vehicles, each of the ropes 15 is provided with an extended end 27, or is made of extra length. In other words it may be as long or longer than may be required for the forward top iron to the rear top iron of the largest automobile. Then the block 18 may be adjusted along the rope 15 in order to fit the device to any ordinary automobile; and the surplus end 27 may be cut off.

Variations may be resorted to within the scope of the invention, and portions of the improvements may be used with others.

Having thus described my invention, I claim:

1. A temporary support for an automobile top, comprising a rope having at one end a device for detachably catching upon a part provided upon the automobile, and at the other end secured to a block, and a lever having a short arm to which said block is pivoted; said lever having a fulcrum for detachably engaging a catch upon the automobile, and said short arm of said lever having a toggle relation to the rope, to enable the latter to be tautened and locked in its tautened condition.

2. A temporary support for an automobile top, comprising a rope having at one end a device for detachably catching upon a part provided upon the automobile, and at the other end secured to a block, and a lever having a short arm to which said block is pivoted; said lever having a fulcrum for detachably engaging a catch upon the automobile, said short arm of said lever having a toggle relation to the rope, to enable the latter to be tautened and locked in its tautened condition, a device being provided for releasably securing said rope to said block, to permit the adjustment of the block along the rope, whereby the effective length of the rope may be varied to fit it to different automobiles.

3. A temporary support for an automobile top, comprising a rope having at one end a device for detachably catching upon a part provided upon the automobile, and at the other end secured to a block, and a lever having a short arm to which said block is pivoted; said lever having a fulcrum for detachably engaging a catch upon the automobile, said short arm of said lever having a toggle relation to the rope to enable the latter to be tautened and locked in its tautened condition, and means to limit the throw of the lever when tautening and locking said rope.

ELIAL M. STAPLES.

Witnesses:
N. D. NEUMANN,
THOMAS ESPUERITO.

---

Copies of this patent may be obtained for five cents each, by addressing the "Commissioner of Patents. Washington, D. C."